(12) United States Patent
Adams

(10) Patent No.: US 7,002,774 B2
(45) Date of Patent: Feb. 21, 2006

(54) RECIRCULATING FILTER FOR A DATA STORAGE DEVICE

(75) Inventor: Carl Fred Adams, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/263,260

(22) Filed: Oct. 2, 2002

(65) Prior Publication Data

US 2003/0202275 A1 Oct. 30, 2003

Related U.S. Application Data

(60) Provisional application No. 60/375,795, filed on Apr. 26, 2002.

(51) Int. Cl.
*G11B 33/14* (2006.01)
(52) U.S. Cl. .................................. 360/97.02
(58) Field of Classification Search ............. 360/97.02
See application file for complete search history.

(56) References Cited

U.S. PATENT DOCUMENTS

| | | | |
|---|---|---|---|
| 4,594,626 A | | 6/1986 | Frangesh |
| 5,754,365 A | * | 5/1998 | Beck et al. .............. 360/97.02 |
| 5,898,545 A | * | 4/1999 | Schirle .................... 360/254.7 |
| 5,907,453 A | * | 5/1999 | Wood et al. ............. 360/97.02 |
| 5,995,323 A | | 11/1999 | Jinbo et al. |
| 6,008,965 A | | 12/1999 | Izumi et al. |
| 6,108,164 A | | 8/2000 | Weber, Jr. ................ 360/97.02 |
| 6,208,484 B1 | | 3/2001 | Voights .................... 360/97.02 |
| 6,594,108 B1 | * | 7/2003 | Naganathan et al. ...... 360/97.02 |
| 2001/0017744 A1 | | 8/2001 | Bae et al. ................ 360/97.02 |
| 2001/0028527 A1 | | 10/2001 | Bae et al. ................ 360/97.02 |

FOREIGN PATENT DOCUMENTS

| | | |
|---|---|---|
| EP | 0 534 745 | 3/1993 |
| WO | WO 0049616 | 8/2000 |

* cited by examiner

Primary Examiner—A. J. Heinz
(74) Attorney, Agent, or Firm—Westman, Champlin & Kelly, P.A.

(57) ABSTRACT

A filtering apparatus and associated method for recirculating fluid in a data storage device. The filtering apparatus comprises a fluid flow guiding member and a filter. The fluid flow guiding member comprises a shroud disposable substantially transverse to the disc comprising an arcuate surface in a closely mating relationship with the disc edge. The fluid flow guiding member further comprises a recessed surface disposable radially outwardly from the disc and cooperatively with the shroud defining a fluid passageway. First edges in the shroud define an inlet to the passageway, and second edges in the shroud define an outlet from the passageway. The filtering apparatus further comprises a filter that is supportable by the fluid flow guiding member within the passageway. The filter provides a curved member against which the fluid flow first impingingly engages upon entering the passageway, thereby being guided by the curved filter toward the outlet. In some embodiments the fluid flow guiding member is formed by a portion of the enclosure base structure; alternatively, the fluid flow guiding member can be a component attached to the enclosure base.

24 Claims, 4 Drawing Sheets

RECIRCULATING FILTER FOR A DATA STORAGE DEVICE

CROSS REFERENCE TO RELATED APPLICATIONS

This application claims the benefit of U.S. Provisional Application No. 60/375,795 Apr. 26, 2002.

FIELD OF THE INVENTION

This invention relates generally to the field of fluid flow control in a rotating media data storage device and more particularly but without limitation to an apparatus and associated method for filtering recirculating fluid.

BACKGROUND OF THE INVENTION

Modern data storage devices are used in a multitude of computer environments to store large amounts of data in a form that is readily available to a user. Generally, a disc drive is a data storage device having one or more data storage discs forming a disc stack that is rotated by a motor at high speeds. Each disc has a data storage surface divided into a series of generally concentric data tracks where data is stored, such as in the form of magnetic flux transitions.

A data transfer member, such as a magnetic transducer, is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance away from the data storage surface as the data transfer member flies upon a fluid bearing generated by a fluid flow caused by the spinning discs. In some cases the fluid can be air, or alternatively it can be other fluids such as an inert gas like helium.

A continuing trend in the industry is toward ever-increasing the data storage capacity and processing speed while maintaining and even reducing the physical size of the disc drive. Consequently, continual efforts are being made to miniaturize the data transfer member and supporting structures, increase data storage densities, and decrease data transfer member fly height, resulting in overall increased sensitivities to vibration and noise. At the same time, continual increases in disc speed for faster data access time have resulted in the fluid flow becoming a more significant impact to be considered.

A number of measures can be taken to minimize the effects of the outwardly spiraling fluid flow on the components. Shrouding the discs, for example, reduces the amount of mixing of flow currents from opposite sides of a disc at the disc edge. Otherwise, these opposing currents can impart coupling forces on the disc at the edge causing disc flutter. Strippers are also used to divert the fluid flow away from the data transfer member.

In any event, the fluid flowing outwardly in the disc stack sets up pressure gradients resulting in turbulence when high and low pressure flows mix. For this reason it is advantageous to configure the shroud and otherwise provide fluid strippers or dams to establish a flow circuit guiding the flow away from the disc stack back and then into the disc stack. In doing so, a smooth transition is necessary in order to prevent turbulent flows or excessive back pressures.

It is also advantageous to place a porous filter in the path of this recirculation flow circuit in order to trap fluid borne particulates. Use of a filter can be problematic, however, because the resulting decreased flow rate and the increased back pressure can propagate perturbations upstream to adversely affect the rotating disc.

One attempted solution to this problem has been to isolate the filter as far as possible from the disc. Somewhat elaborate channels have been employed to lengthen distance between the disc and the filter. This solution is limited, however, due to space constraints. As the filter is moved farther away within a fixed space it must necessarily be made smaller. The reduced size of the filter and the convoluted recirculation circuits limit the flow rate capability of the recirculation circuit.

Contrarily, it is advantageous to maximize the size of the filter. Increasing the filter face area reduces the pressure drop across the filter and makes higher flow rates possible without effecting adverse back pressures. It has been determined that a maximum size filter can be achieved by using a curved filter as a guiding vane in the recirculation circuit to guide the fluid flow while filtering it. It is to these improvements and others as exemplified by the description and appended claims that embodiments of the present invention are directed.

SUMMARY OF THE INVENTION

The embodiments of the present invention contemplate an enclosure base structure adapted for supporting a filter in a data storage device wherein a data transfer member cooperates with one or more rotating data storage discs forming a disc stack in reading data from and writing data to the disc. The moving disc imparts a velocity to the fluid surrounding the disc, resulting in a generally outwardly spiraling fluid flow.

The enclosure base structure comprises a shroud disposed transverse to the disc and substantially concentric with the disc. The shroud defines an inlet and an outlet that is fluidly connected by a passageway therebetween that is disposed radially beyond the shroud for recirculating fluid flow from and then back to the disc stack. The shroud defines first and second receiving features adapted for receivingly engaging opposing ends of the filter, operably supporting the filter within the passageway and spanning the inlet.

The shroud defines a leading edge and a trailing edge of the inlet. The leading edge, corresponding to the upstream side of the fluid flow, tapers away from the disc edge toward the inlet for locally reducing pressure to urge fluid flow into the inlet. The trailing edge is disposed in a closely mating relationship with the disc edge. The leading edge and trailing edges can intersect the inlet with an arcuate surface, smoothing the fluid flow entry to the inlet. In one embodiment the first receiving feature is disposed adjacent the inlet leading edge.

The portion of the shroud between the inlet and the outlet comprises a first arcuate surface disposed in a closely mating relationship with the disc edge. This portion of the shroud further comprises an opposing second surface defining one side of the passageway, wherein the second surface comprises the second retaining feature. The retaining features can comprise slots disposed and adapted for a sliding receiving engagement with the respective ends of the filter.

The enclosure base structure comprises a recessed surface disposed substantially transverse to the disc and radially beyond the shroud, defining another side of the passageway. The recessed surface can be substantially concentric with the shroud.

The filter and the shroud second surface define a first chamber in the passageway fluidly connected to the inlet. The filter and the recessed surface define a second chamber in the passageway fluidly connected to the outlet. Fluid flowing through the passageway passes through the filter in flowing from the first chamber to the second chamber.

Another aspect of the embodiments of the present invention contemplates a filter assembly for a data storage device. The filter assembly comprises a fluid flow guide member and a filter. The fluid flow guide member comprises a shroud disposable substantially transverse to the disc comprising an arcuate surface in a closely mating relationship with the disc edge. The fluid flow guide member further comprises the recessed surface disposable radially outwardly from the disc and cooperatively with the shroud defining the fluid passageway. First edges in the shroud define the inlet to the passageway, and second edges in the shroud define the outlet from the passageway. The filter assembly further comprises a filter that is supportable by the fluid flow guide member within the passageway defining the first chamber and the second chamber.

Another aspect of the embodiments of the present invention contemplates a method for filtering fluid that is recirculated through a disc stack. The method comprises providing a shroud circumscribing the disc stack in a substantially closely fitting arrangement with the edge of the disc; establishing an inlet and an outlet in the shroud and a passageway fluidly connecting the inlet and outlet for receiving fluid flowing from the disc stack and returning the fluid to the disc stack; and positioning a curved filter in the fluid flow path at the inlet for receivingly engaging the fluid at the inlet and guiding the fluid flow toward the outlet.

Another aspect of the embodiments of the present invention contemplate a data storage device comprising a rotatable data storage disc stack comprising one or more data storage discs in a data reading and writing relationship with a data transfer member. The data storage device further comprises means for filtering a fluid flow operably generated by the disc stack by guiding the flow through a passageway while recirculating the fluid in the disc stack, wherein the means for filtering is characterized by flowing the fluid toward the concave side of a curved filter within the passageway and wherein at least a portion of the filter is substantially concentric with the disc.

These and various other features as well as advantages which characterize the present invention will be apparent upon reading of the following detailed description and review of the associated drawings.

BRIEF DESCRIPTION OF THE DRAWINGS

FIG. 6 is a flowchart of a method contemplated by the embodiments of the present invention.

DETAILED DESCRIPTION

Figure 1:
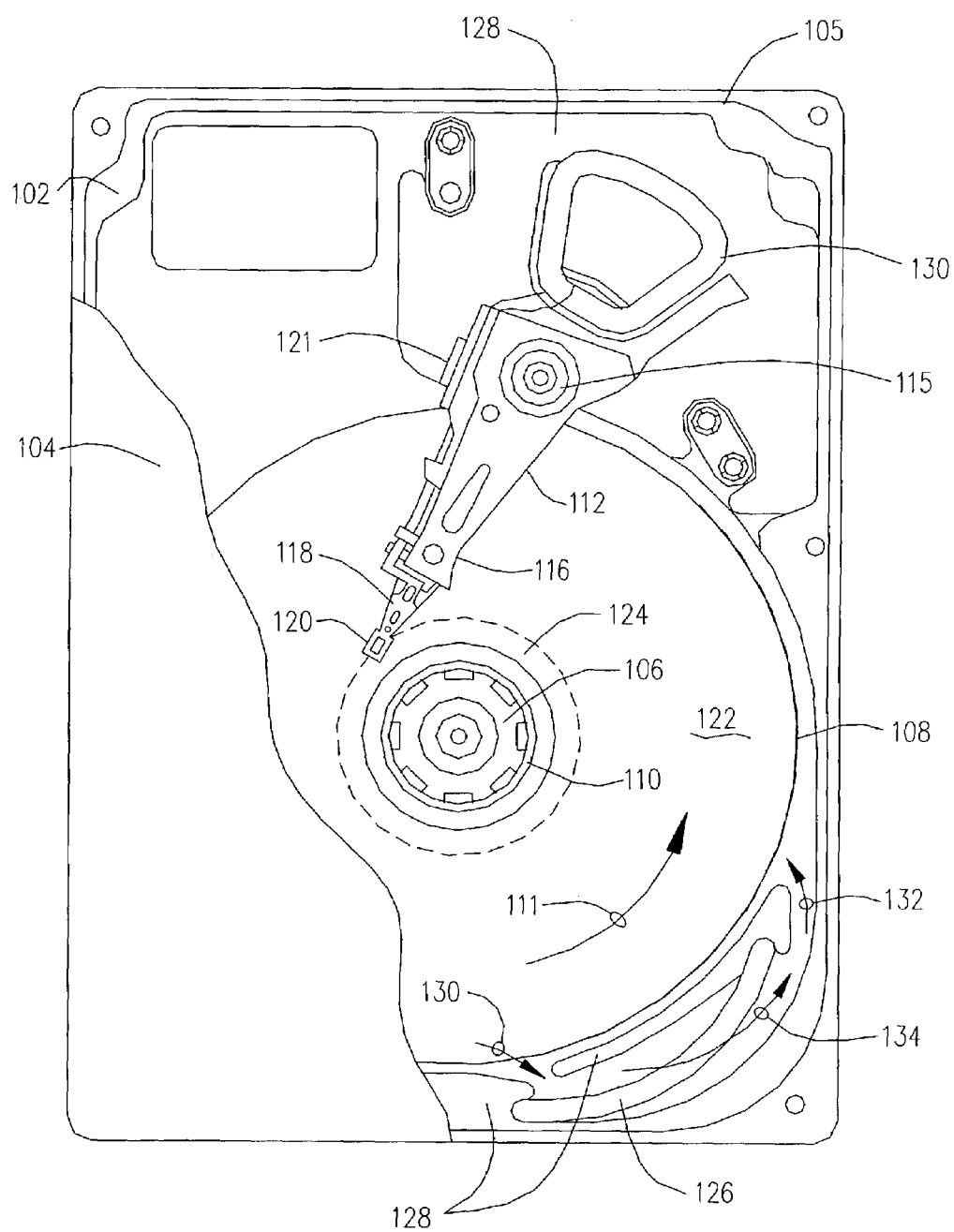
FIG. 1 is a plan view of a rotating media data storage device comprising a recirculating filter assembly constructed in accordance with embodiments of the present invention.

Referring to the drawings in general, and more particularly to FIG. 1, shown therein is a plan representation of a data storage disc drive 100 constructed in accordance with an embodiment of the present invention. The disc drive 100 includes a base 102 to which various components are mounted, and a cover 104 (partially cut-away) which together with the base 102 and a perimeter gasket 105 forms an enclosure providing a sealed internal environment for the disc drive 100.

Mounted to the base 102 is a motor 106 to which one or more data storage discs 108 are stacked and secured by a clamp ring 110 for rotation at a high speed in direction 111. A plurality of discs 108 can be stacked with alternating disc spacers (not shown) to form a disc stack. An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 (or "flexures") are flex members that support data transfer members, such as read/write heads 120 ("heads"), with each of the heads 120 operatively interfacing one of the discs 108 in a data reading and writing relationship. Data read and write signals are transmitted from the head 120 to a preamplifier 121 by electrical traces (not shown) extending along the actuator 112.

Each of the discs 108 has a data storage region comprising a data storage surface 122 divided into concentric circular data tracks (not shown). Each of the heads 120 are positioned adjacent a desired data track to read data from or write data to the data track. A circular landing zone 124 where the heads 120 can come to rest against the respective discs 108 at times when the discs 108 are not spinning. The landing zone 124 can bound the data storage surface 122 inwardly. Alternatively, the landing zone 124 can be located elsewhere.

The actuator 112 is positioned by a voice coil motor (VCM) 128 comprising an electrical coil 130 and a magnetic circuit source. The magnetic circuit source comprises one or more magnets supported by magnetic poles to complete the magnetic circuit. When controlled current is passed through the actuator coil 130, an electromagnetic field is set up which interacts with the magnetic circuit, causing the actuator coil 130 to move. As the actuator coil 130 moves, the actuator 112 pivots around the pivot bearing 115, causing the heads 120 to travel across the discs 108 within an operable range of movement.

The motor 106 spins the discs 108 at a high speed as the head 120 reads data from and writes data to the data storage surface 122. The kinetic energy of the spinning discs 108 transfers through the boundary layer at the disc/surrounding fluid interface, thereby inducing a rotational force component to a fluid flow, while centrifugal force imparts a radial force component to the fluid flow, creating a generally outwardly spiraling flow. The head 120 includes an aerodynamic slider portion (not shown), which engages the fluid flow to fly the head 120 away from the data storage surface 122 during data reading and writing operations.

The fluid within the enclosure upon which the head 120 flies can be air. Alternatively, the fluid can be another fluid such as an inert gas like helium.

As the disc rotates, the outward flow of fluid produces pressure gradients within the disc stack. Generally, the pressure is relatively greater at the outer radius of the disc 108 and progressively lower toward the inner radius of the disc. The embodiments of the present invention harness this pressure gradient in order to effectively recirculate the fluid flow along a recirculation circuit as it flows out of the disc stack and is then directed back into the disc stack. In this recirculation circuit a filter traps any fluid borne particulates in the recirculating fluid.

The embodiments of the present invention contemplate an enclosure base structure adapted for supporting a filter 126 in the data storage device 100. The enclosure base structure includes a shroud 128 disposed substantially transverse to the disc 108 and concentric with the disc 108. The shroud 128 minimizes the amount of fluid coupling that takes place from fluid flowing along opposing sides of the disc 108. This minimizes the amount of turbulence at the disc edge, and locally pressurizes the outwardly flowing fluid at the disc edge.

The shroud 128 defines an inlet 130 and an outlet 132 that are fluidly connected by a passageway 134 therebetween. The direction of disc rotation, as indicated by reference number 111) in cooperation with the placement of the shroud 128 effectively directs relatively high pressure fluid into the inlet 130. The passageway 134 extends radially beyond the shroud 128 providing the circuit for recirculating fluid flow from the disc stack and then back to the disc stack. The relatively large opening between the enclosure and the disc edge at the outlet 132 creates a relatively low pressure area that draws the fluid into the disc stack.

Figure 2:
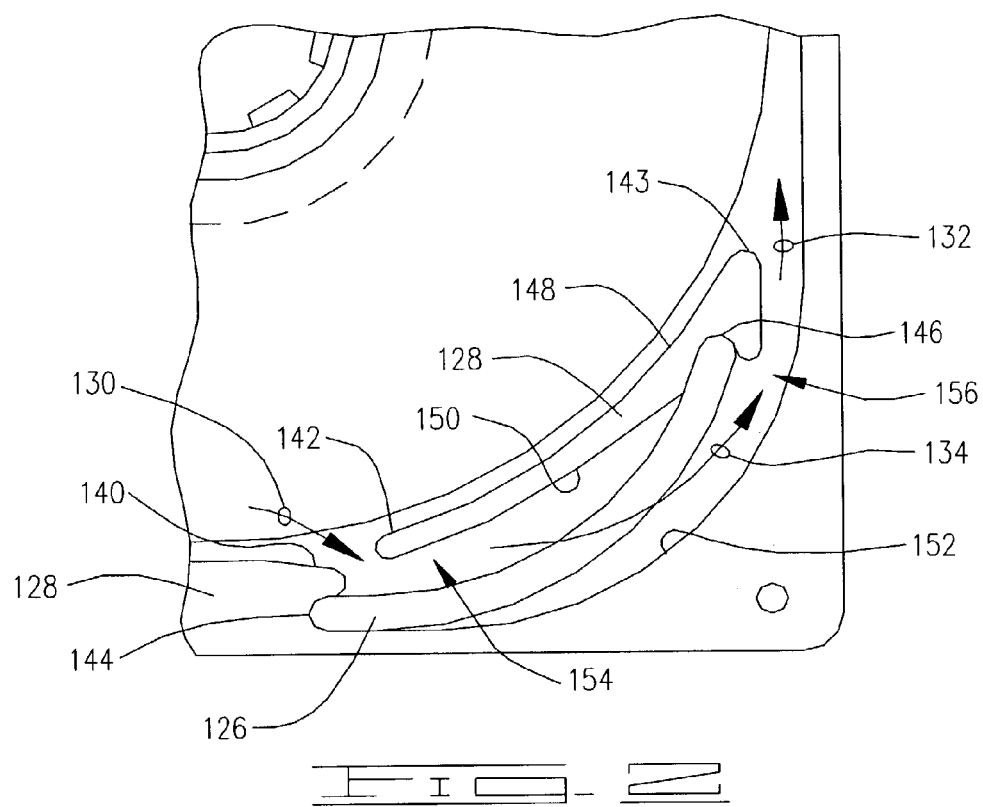
FIG. 2 is an enlarged detail view of a portion of the enclosure base structure of the data storage device of FIG. 1.

More particularly, FIG. 2 illustrates the inlet 130 being formed by a leading edge 140 and a trailing edge 142 of the shroud 128, wherein the leading edge 140 corresponds with the upstream side of the fluid flow moving generally in direction 111 (FIG. 1). The leading edge 140 tapers away from the disc edge toward the inlet 130 for locally reducing pressure and thereby urging fluid flow into the inlet 130. The trailing edge 142 is disposed in a closely mating relationship with the disc edge in order to reestablish the relatively high pressure at the disc edge on the opposing side of the inlet 130. Preferably, the leading edge 140 and trailing edge 142 intersect the inlet 130 with an arcuate surface, smoothing the fluid flow entry to the inlet 130. The shroud 128 also defines a leading edge 143 of the outlet 132 in close mating relationship with the disc edge, and is likewise rounded for a smooth transition of the fluid in the outlet 132.

The shroud 128 defines a first retaining feature 144 adapted and disposed for receivingly engaging a first end of the filter 126. The shroud 128 further defines a second retaining feature 146 adapted and disposed for receivingly engaging a second end of the filter 126. In this manner the shroud 128 operably supports the filter 126 within the passageway 134 so as to span the inlet 130. As shown by FIG. 2, the retaining features 144, 146 can comprise slots adapted for a sliding receiving engagement with the respective ends of the filter 126.

Figure 3:
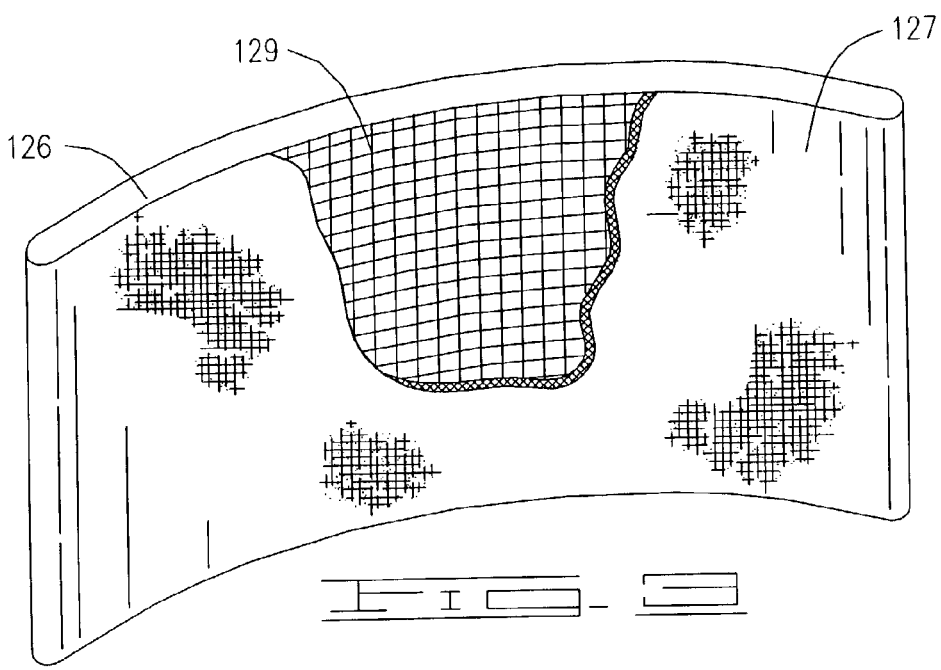
FIG. 3 is an isometric view of the filter, partially broken away to reveal the shape retention member.
Figure 5:
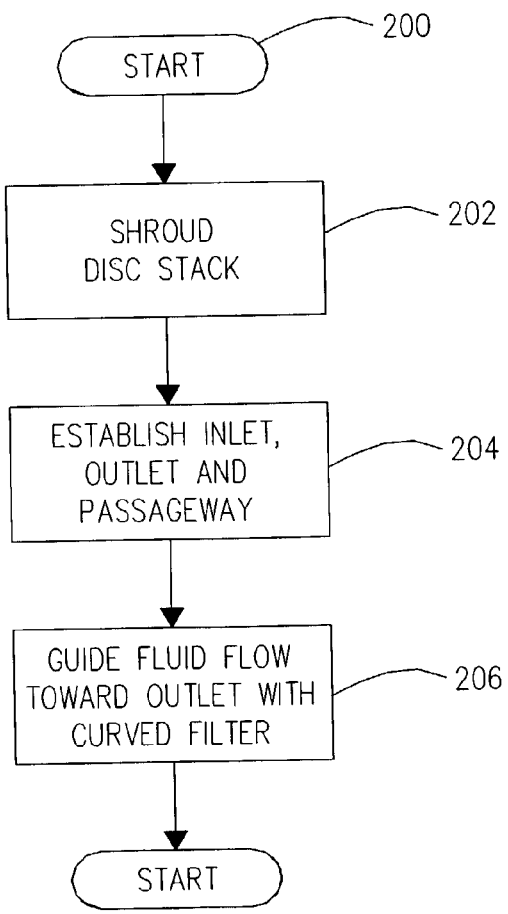
FIG. 5 is an exploded isometric view of the fluid filter assembly of FIG. 4.
Figure 5:
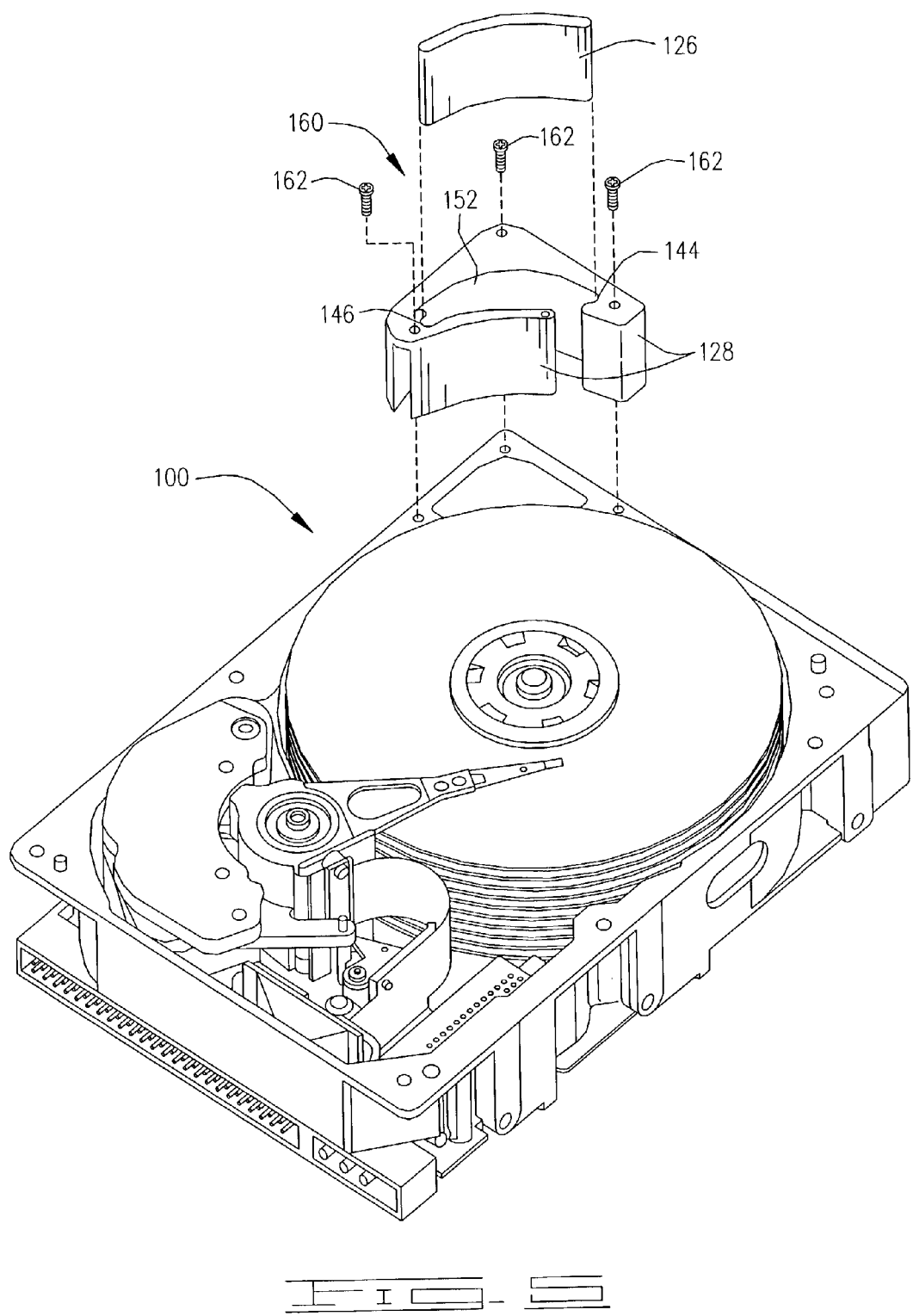

The filter 126 can be an elastically flexible member that achieves a desired shape only after the ends thereof are secured in the retaining features 144, 146. In some instances the desired length may be such that a straight filter is achieved. Preferably, the filter 126 is a plastically deformable member that can be formed into a desired shape associated with the retaining features 144, 146, and will retain that shape. FIG. 3, for example, illustrates a plastically deformable, shape-retaining type filter 126. The filter 126 has a fibrous material 127 wrapped around a deformable mesh 129, such as a stainless steel screen.

According to the embodiment of FIG. 2 the first receiving feature 144 is disposed adjacent the inlet leading edge 140. The portion of the shroud 128 between the inlet 130 and the outlet 132 comprises a first arcuate surface 148 disposed in a closely mating relationship with the disc edge, and an opposing second surface 150 defining one side of the passageway 134. In this exemplary embodiment the second surface 150 comprises the second retaining feature 146.

The enclosure base structure of FIG. 2 further comprises a recessed surface 152 disposed substantially transverse to the disc 108 and radially beyond the shroud 128, defining another side of the passageway 134. The recessed surface 152 generally defines a smooth surface, and can be substantially concentric with the disc 108.

Accordingly, the filter 126 and the shroud second surface 150 define a first chamber 154 in the passageway 134 that is fluidly connected to the inlet 130. Downstream, the filter 126 and the recessed surface 152 define a second chamber 156 in the passageway 134 that is fluidly connected to the outlet 132. The recirculating fluid thus flows into the inlet 130, through the first chamber 154, then through the second chamber 156, and then out the outlet 132. In flowing from the first chamber 154 to the second chamber 156 the fluid passes through the filter 126. By first impacting against the concave side of the filter 126, the fluid entering the first chamber 154 is both guided and filtered by the filter 126. This results in significantly less back pressure in comparison to that of using some portion of the base enclosure to guide the fluid toward a downstream filter. Using the filter as both a guide and a filtering member also permits using the maximum size filter for a given space.

Figure 4:
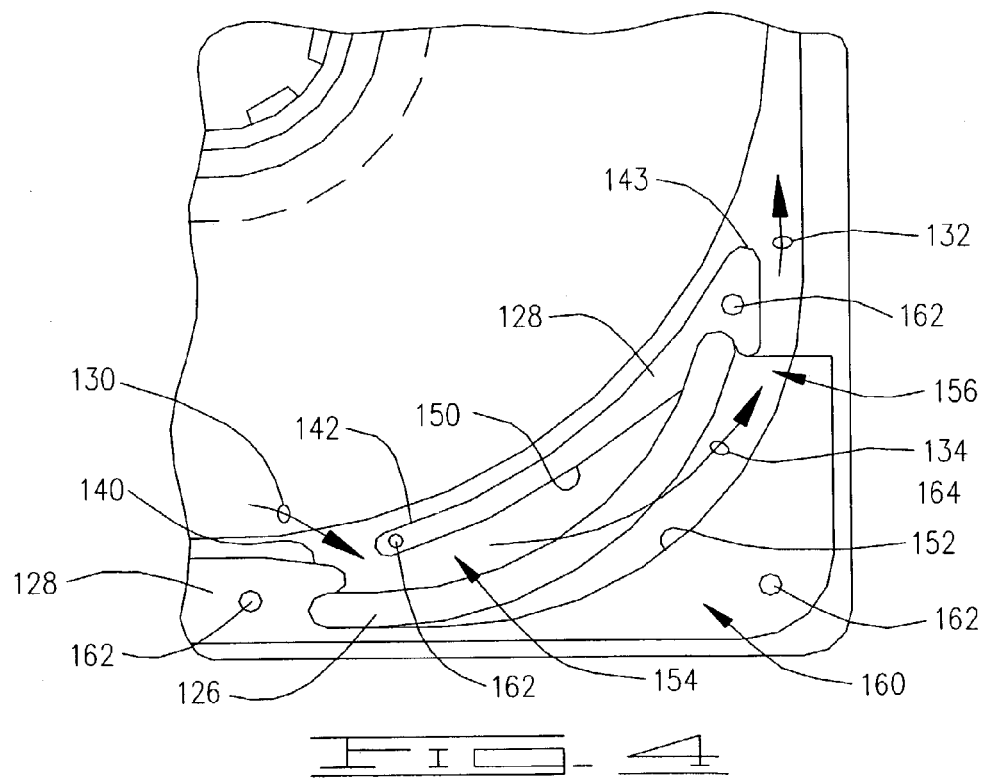
FIG. 4 is a view similar to FIG. 2 but showing a fluid filter assembly adapted for use in the data storage device of FIG. 1.

In the illustrative embodiment above an enclosure base structure for supporting the filter 126 is contemplated. Alternatively, FIGS. 3 and 4 illustrate a filter assembly 160 that can be attached to the enclosure such as with a number of fasteners 162.

The filter assembly 160 comprises a fluid flow guide member 164 and the filter 126. In a similar manner as above, the fluid flow guide member 164 comprises the shroud 128 disposable substantially transverse to the disc 108. The shroud 128 comprises the arcuate surface 148 in a closely mating relationship with the disc edge. The fluid flow guide member 164 further comprises the recessed surface 152 disposable radially outwardly from the disc 108 and cooperatively with the shroud 128 defines the fluid passageway 134. First edges 140, 142 define the inlet 130 to the passageway 134; second edge 143 defines the outlet 132 from the passageway 134.

The filter assembly 160 further comprises the filter 126 supportable by the fluid flow guide member 164 within the passageway 134 defining the first chamber 154 in the passageway 134 between a portion of the shroud 128 and the filter 126 and fluidly connected to the inlet 130. Also, the second chamber 156 is defined in the passageway 134 between the filter 126 and the recessed surface 152 fluidly connected to the outlet 132.

The embodiments of the present invention further contemplate a method for filtering fluid that is being recirculated through a disc stack in a data storage device. FIG. 6 illustrates in one embodiment the method 200 begins with block 202 wherein shrouding is provided around at least a portion of the disc stack in a substantially closely fitting arrangement with the edge of the disc. In block 204 an inlet is provided adjacent the disc edge at a shrouded portion, as well as an outlet and a passageway fluidly connecting the inlet to the outlet. In this manner, fluid is pressurized by the shroud and urged into the inlet, where it then flows through the passageway and out the outlet where it is reintroduced into the disc stack. The method continues at step 206 wherein a curved filter is positioned in the passageway for receivingly engaging the fluid at the inlet and guiding the fluid flow toward the outlet.

It will be noted that the shrouding step 202 can further comprise providing a shroud comprising the first and second retaining portions 144, 146 (FIG. 2) adapted for receivingly engaging opposing ends of the filter 126. Also, the guiding step 206 can comprise positioning the concave side of the filter 126 toward the upstream side of the fluid flow to facilitate the necessary guiding of the fluid flow toward the outlet 132.

In another embodiment of the present invention a data storage device is contemplated comprising a rotatable data storage disc stack comprising one or more data storage discs in a data reading and writing relationship with a data transfer member, and means for filtering a fluid flow operably generated by the disc stack. The means for filtering is characterized by guiding the flow through a passageway to recirculate the fluid in the disc stack, wherein the means for filtering is further characterized by flowing the fluid toward the concave side of a curved filter within the passageway and wherein at least a portion of the filter is substantially concentric with the disc.

The means for filtering can be further characterized by a shroud member disposed substantially transversely to the disc defining an inlet admitting fluid flow into the passageway from the disc stack and defining an outlet admitting fluid flow out of the passageway to the disc stack, the shroud comprising first and second retaining features adapted for receivingly engaging opposing ends of the filter, operably supporting the filter within the passageway and spanning the inlet.

The means for filtering can be further characterized by a recessed surface disposed substantially transversely to the disc and radially beyond the shroud with respect to the disc, the recessed surface and a portion of the shroud defining opposing sides of the passageway, wherein the means for filtering is further characterized by a first chamber in the passageway between a portion of the shroud and the filter and fluidly connected to the inlet, and a second chamber in the passageway between the filter and the recessed surface and fluidly connected to the outlet. Accordingly, the means for filtering can be further characterized by the fluid passing through the filter in flowing from the first chamber to the second chamber.

In this manner, it is noted that the means for filtering contemplates the use of the filter 126 as a guiding member, or guiding vane, for directing the fluid flow toward the outlet 132 in the passageway 134. It will be noted that the means for filtering thus does not contemplate an arrangement wherein the fluid flow in the passageway first impinges against a nonfiltering type member, such as a solid or semi-solid portion of the base enclosure structure, which then guides the fluid flow toward the filter. Such an arrangement does not produce the filtering results with a comparably low pressure drop across the passageway, or permit the relatively large size filter available herein. The embodiments contemplated by the means for filtering of the present invention result in superior performance results by minimizing the flow restriction and back pressure acting upstream of the inlet, which can otherwise produce turbulence in the area of the shedding fluid flow from the disc stack.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and shape of the filter may vary while maintaining substantially the same functionality without departing from the scope and spirit of the present invention. In addition, although the preferred embodiment described herein is directed to use in a disc drive data storage device, it will be appreciated by those skilled in the art that the teachings of the present invention can be applied to other types of work pieces as well without departing from the scope and spirit of the present invention.

What is claimed is:

1. An enclosure base structure adapted for supporting a filter in a data storage device, wherein one or more data storage discs form a disc stack that, when rotated, impart a velocity to a fluid around the disc resulting in a generally outwardly spiraling fluid flow, the enclosure base structure further comprising a shroud disposed transverse to the disc and concentric with the disc, the shroud defining an inlet having a leading edge and a trailing edge, the leading edge corresponding to the upstream side of the fluid flow and tapering away from the disc edge toward the inlet for locally reducing pressure to urge fluid flow into the inlet, the trailing edge disposed in a closely mating relationship with the disc edge, the shroud defining an outlet that is fluidly connected by a passageway between the inlet and the outlet and disposed radially beyond the shroud for recirculating fluid flow from and then back to the disc stack, the shroud defining first and second receiving features adapted for receivingly engaging opposing ends of the filter, operably supporting the filter within the passageway and extending across the passageway, wherein the filter guides the fluid flow toward the outlet and back to the disc stack.

2. The enclosure base structure of claim 1 wherein the retaining features comprise slots disposed and adapted for a sliding receiving engagement with the respective ends of the filter.

3. The enclosure base structure of claim 1 wherein the leading edge and trailing edges intersect the inlet with an arcuate surface, smoothing the fluid flow entry to the inlet.

4. The enclosure base structure of claim 1 wherein the first receiving feature is disposed adjacent the inlet leading edge.

5. The enclosure base structure of claim 1 wherein the portion of the shroud between the inlet and outlet comprises:
   a first arcuate surface disposed in a closely mating relationship with the disc edge; and
   an opposing second surface defining one side of the passageway, the second surface comprising the second retaining feature.

6. The enclosure base structure of claim 5 wherein the enclosure base structure comprises a recessed surface disposed substantially transverse to the disc and radially beyond the shroud, defining another side of the passageway.

7. The enclosure base structure of claim 6 wherein the recessed surface is substantially concentric with the shroud.

8. The enclosure base structure of claim 6 wherein the filter and the shroud second surface operably define a first chamber in the passageway fluidly connected to the inlet.

9. The enclosure base structure of claim 8 wherein the filter and the recessed surface operably define a second chamber in the passageway fluidly connected to the outlet.

10. A filter assembly for a data storage device wherein one or more rotating data storage discs form a disc stack, wherein the moving disc stack imparts a velocity to a fluid surrounding the disc resulting in a generally outwardly spiraling fluid flow, the filter assembly comprising:
a fluid flow guide, comprising:
a shroud disposable substantially transverse to the disc comprising an arcuate surface in a closely mating relationship with the disc edge; and
a recessed surface disposable radially outwardly from the disc and cooperatively with the shroud defining a fluid passageway;
first edges in the shroud defining an inlet to the passageway;
at least a second edge in the shroud defining an outlet from the passageway; and
a filter supportable by the fluid flow guide within the passageway defining a first chamber in the passageway between a portion of the shroud and the filter and fluidly connected to the inlet, and defining a second chamber in the passageway between the filter and the recessed surface fluidly connected to the outlet, wherein the filter guides the fluid flow from the first chamber to the second chamber toward the outlet and back to the disc stack.

11. The filter assembly of claim 10 wherein the filter comprises a fibrous material wrapped around a plastically deformable screen mesh.

12. The filter assembly of claim 10 wherein the first edges comprise a leading edge corresponding to the upstream fluid flow and a trailing edge, the leading edge operatively tapering away from the disc edge toward the inlet, locally reducing pressure and urging fluid flow into the inlet, the trailing edge in a closely mating relationship with the disc edge.

13. The filter assembly of claim 12 wherein the leading edge and trailing edges intersect the inlet with an arcuate surface, operatively smoothing the fluid flow entry to the inlet.

14. The filter assembly of claim 12 wherein the shroud comprises first and second retaining features adapted for receivingly engaging opposing ends of the filter, operatively supporting the filter within the passageway and extending along the passageway between the recessed surface and the shroud.

15. The filter assembly of claim 14 wherein the first retaining feature is disposed adjacent the inlet leading edge.

16. The filter assembly of claim 14 wherein the portion of the shroud between the inlet and outlet comprises an opposing second surface adjacent the passageway, the second surface comprising the second retaining feature.

17. The filter assembly of claim 14 wherein the retaining features comprise slots disposed and adapted for a sliding receiving engagement with the respective ends of the filter.

18. The filter assembly of claim 10 wherein the recessed surface is operatively substantially concentric with the shroud.

19. A method for filtering fluid that is recirculated through a disc stack having one or more moving data storage discs in a data storage device, the method comprising:
providing a shroud around the disc stack in a substantially closely fitting arrangement with the edge of the disc;
establishing an inlet and an outlet in the shroud and a passageway fluidly connecting the inlet and outlet for receiving fluid flowing from the disc stack and returning the fluid to the disc stack; and
positioning a curved filter in the fluid flow path at the inlet such that the concave side of the filter engages upstream side of the fluid at the inlet and guiding the fluid flow toward the outlet.

20. The method of claim 19 wherein the providing step comprises a shroud providing first and second retaining portions adapted for receivingly engaging opposing ends of the filter.

21. A data storage device, comprising:
a rotatable data storage disc stack comprising one or more data storage discs in a data reading and writing relationship with a data transfer member; and
means for filtering a fluid flow operably generated by the disc stack by guiding the flow through a passageway recirculating the fluid in the disc stack, wherein the means for filtering is characterized by flowing the fluid toward the concave side of a curved filter within the passageway and wherein at least a portion of the filter is substantially concentric with the disc.

22. The data storage device of claim 21 wherein the means for filtering is characterized by a shroud member disposed substantially transversely to the disc defining an inlet admitting fluid flow into the passageway from the disc stack and defining an outlet admitting fluid flow out of the passageway to the disc stack, the shroud comprising first and second retaining features adapted for receivingly engaging opposing ends of the filter, operably supporting the filter within the passageway and spanning the inlet.

23. The data storage device of claim 22 further comprising a recessed surface disposed substantially transversely to the disc and radially beyond the shroud with respect to the disc, the recessed surface and a portion of the shroud defining opposing sides of the passageway, wherein the means for filtering is characterized by a first chamber in the passageway between a portion of the shroud and the filter and fluidly connected to the inlet, and a second chamber in the passageway between the filter and the recessed surface and fluidly connected to the outlet.

24. The data storage device of claim 23 wherein the means for filtering is characterized by the fluid passing through the filter in flowing from the first chamber to the second chamber.

* * * * *